(12) United States Patent
Ishiwata et al.

(10) Patent No.: US 7,783,186 B2
(45) Date of Patent: Aug. 24, 2010

(54) IMAGING APPARATUS, IMAGING APPARATUS CONTROL METHOD, AND COMPUTER PROGRAM

(75) Inventors: Hisashi Ishiwata, Kanagawa (JP); Yoshito Terashima, Tokyo (JP); Tetsuo Mise, Tokyo (JP); Masakazu Koyanagi, Chiba (JP)

(73) Assignee: Sony Corporation, Tokyo (JP)

( * ) Notice: Subject to any disclaimer, the term of this patent is extended or adjusted under 35 U.S.C. 154(b) by 586 days.

(21) Appl. No.: 11/760,436

(22) Filed: Jun. 8, 2007

(65) Prior Publication Data
US 2007/0286589 A1 Dec. 13, 2007

(30) Foreign Application Priority Data
Jun. 9, 2006 (JP) ............... 2006-160455

(51) Int. Cl.
*G03B 3/10* (2006.01)
*G03B 13/00* (2006.01)
*G06K 9/00* (2006.01)

(52) U.S. Cl. .......... 396/123; 348/345; 382/118
(58) Field of Classification Search .......... 396/72, 396/79, 89, 123, 125, 263, 264; 348/169, 348/231.99, 345, 354; 382/118
See application file for complete search history.

(56) References Cited

U.S. PATENT DOCUMENTS
5,877,809 A * 3/1999 Omata et al. ............ 348/345
7,574,128 B2 * 8/2009 Matsuda ............ 396/264
2006/0285842 A1 * 12/2006 Ide .......................... 396/93

FOREIGN PATENT DOCUMENTS
| JP | 5-203862 | 8/1993 |
| JP | 6-202222 | 7/1994 |
| JP | 10-293342 | 11/1998 |
| JP | 2004-133637 | 4/2004 |

OTHER PUBLICATIONS
U.S. Appl. No. 12/334,715, filed Dec. 15, 2008, Mise, et al.
U.S. Appl. No. 12/358,917, filed Jan. 23, 2009, Mise, et al.
U.S. Appl. No. 11/756,207, filed May 31, 2007, Mise et al.
U.S. Appl. No. 11/760,481, filed Jun. 8, 2007, Tereshima.
U.S. Appl. No. 11/773,247, filed Jul. 3, 2007, Ishiwata, et al.

* cited by examiner

*Primary Examiner*—Melissa J Koval
*Assistant Examiner*—Minh Q Phan
(74) *Attorney, Agent, or Firm*—Oblon, Spivak, McClelland, Maier & Neustadt, L.L.P.

(57) ABSTRACT

An imaging apparatus includes a face detecting unit that detects a face area from an input image inputted in the imaging apparatus and a control unit that executes a focus operation according to adjustment of a focus lens. The control unit judges whether, during the focus operation, a new face has appeared in a position closer to the imaging apparatus than a position of a face closest to the imaging apparatus among faces detected before the start of the focus operation on the basis of the number and sizes of the faces detected and performs processing for re-executing or stopping the focus operation on the basis of a judgment result indicating that a new face has appeared in a position closer to the imaging apparatus.

15 Claims, 10 Drawing Sheets

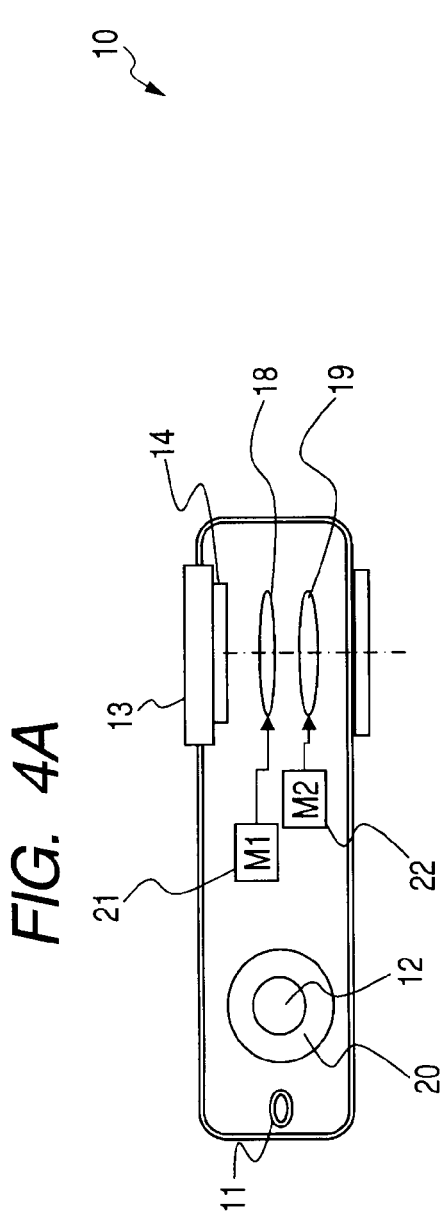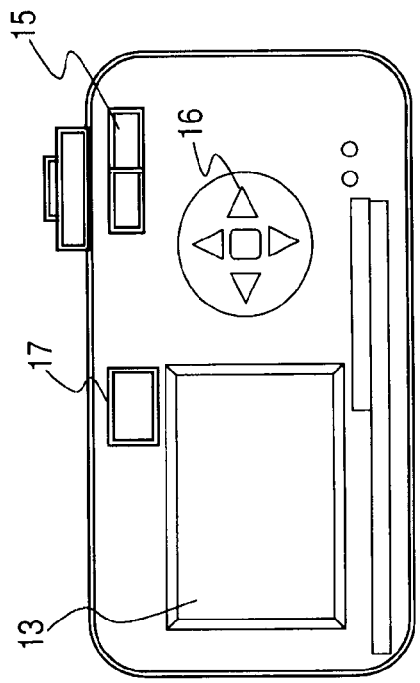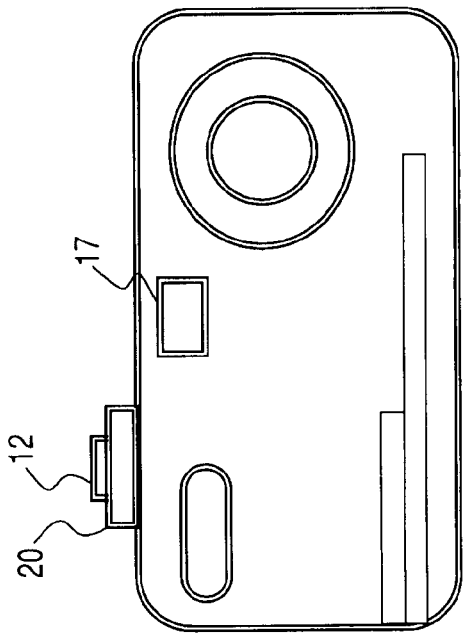

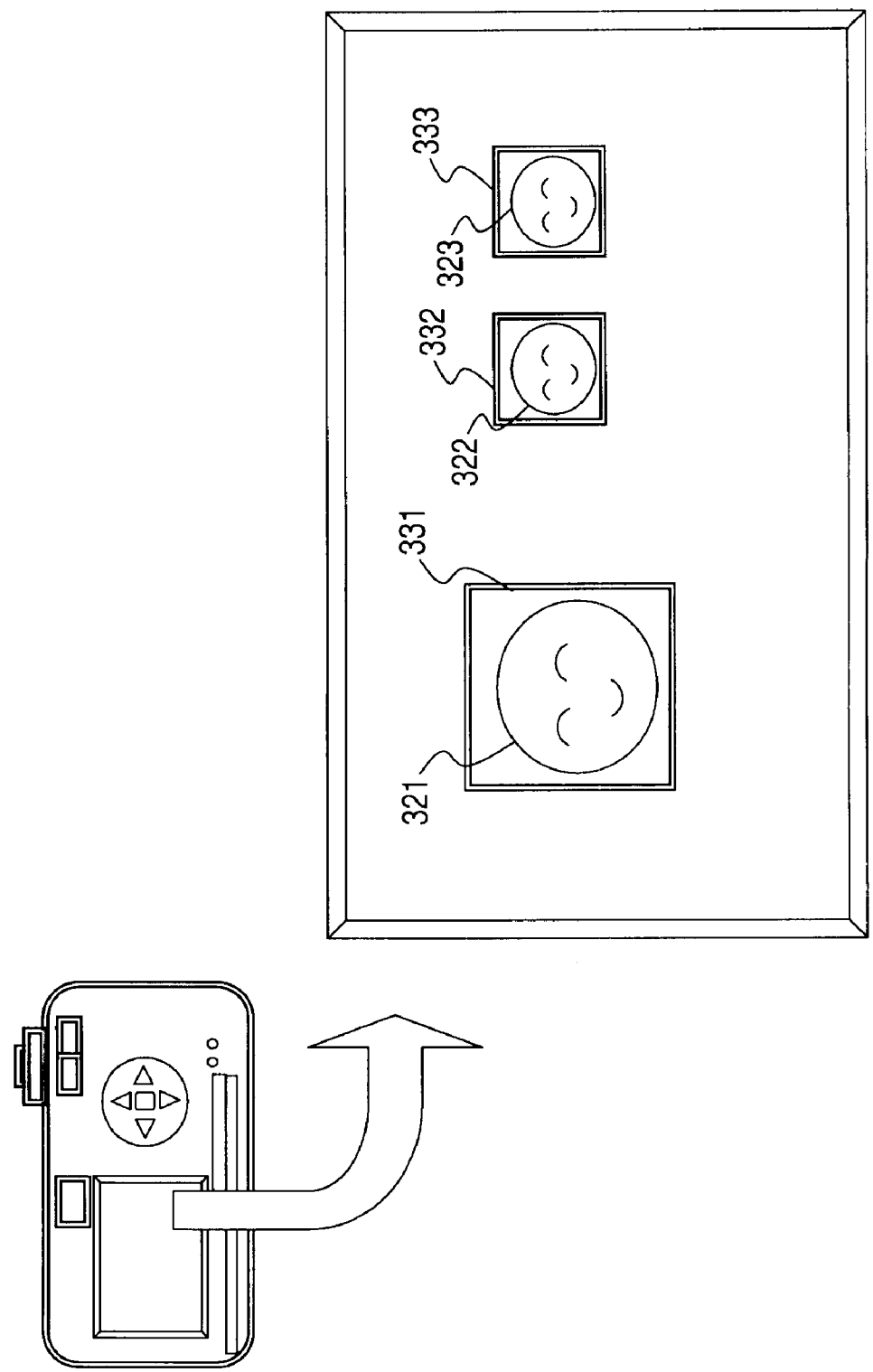

US 7,783,186 B2

IMAGING APPARATUS, IMAGING APPARATUS CONTROL METHOD, AND COMPUTER PROGRAM

CROSS-REFERENCES TO RELATED APPLICATIONS

The present invention contains subject matter related to Japanese Patent Application JP 2006-160455 filed in the Japanese Patent Office on Jun. 9, 2006, the entire contents of which being incorporated herein by reference.

BACKGROUND OF THE INVENTION

1. Field of the Invention

The present invention relates to an imaging apparatus, an imaging apparatus control method, and a computer program. More specifically, the present invention relates to an imaging apparatus, an imaging apparatus control method, and a computer program that make it possible to perform accurate auto-focus processing for a target subject.

2. Description of the Related Art

Recently, an auto-focus (AF) mechanism that automatically takes the focus on a subject is mounted on many imaging apparatuses such as a still camera and a video camera. In photographing by general cameras, people are main subjects in a large number of cases. However, the people are present in various positions in photographed images and there are various compositions of the images. From the very beginning, a target subject may be present in a position where a range finding area in an imaging apparatus is not set. To cope with such a problem, it is proposed to recognize a face from an image in an imaging apparatus and set a range finding area in a position of the recognized face to make it possible to focus the imaging apparatus on the face regardless of a composition. For example, a focus control technique based on such face recognition is disclosed in JP-A-2003-107335. Focus control based on this face recognition makes it possible to perform appropriate focus control (focusing) in photographing of various compositions.

As a method of focus control, a method of judging a level of contrast of imaging data acquired via a lens is known. This is a system for setting a specific area of a photographed image as a signal acquisition area for focus control (a spatial frequency extraction area), judging that the lens is more in focus as contrast of this specific area is higher and that the lens is out of focus when the contrast is low, and driving the lens to a position for increasing the contrast to adjust the focus. Such a focus control processing technique is disclosed in, for example, JP-A-10-213737.

Specifically, a method of extracting a high-frequency component of the specific area, generating integrated data of the high-frequency component extracted, and judging a level of contrast on the basis of the high-frequency component integrated data generated is applied to the method of focus control. In other words, plural images are acquired while a focus lens is moved to plural positions and filter processing represented by a high-pass filter is applied to a luminance signal of each of the images to obtain an AF evaluation value indicating contrast intensity of each of the images. In this case, when a just-focused subject focused in a certain focus position is present, an AF evaluation value corresponding to a focus lens position draws a curve shown in FIG. 1. A peak position P1 of this curve, i.e., a position where a contrast value of the image is the maximum is a just-focus position. In this system, it is possible to perform a focus operation on the basis of only information of an image displayed on an imager and it is unnecessary to provide a range-finding optical system other than an imaging optical system. Thus, this system is widely used in digital still cameras recently.

In this way, in the auto-focus control, a high-frequency component integrated value of the specific area is calculated for judging the level of the contrast and used as an evaluation value (an AF evaluation value). Auto-focus is realized by driving the focus lens to maximize the evaluation value. To perform the auto-focus, it is necessary to drive the lens with the evaluation value as a guideline. As a lens driving mechanism, for example, a voice coil motor is used.

However, when another person cuts in front of a subject set as a focus object during such a focus operation, a problem described below occurs. This problem will be explained with reference to FIGS. 2 and 3. In FIG. 2, an AF evaluation value curve 1 corresponding to the target subject and an AF evaluation value curve 2 corresponding to the person who cuts in front of the target subject set as the focus object are shown.

The AF evaluation value curve 2 corresponding to the person who cuts in front of the target subject set as the focus object is alone a curve of an AF evaluation value having a peak in a position closer to the lens than the subject as indicated by a dotted line in FIG. 2.

When the focus operation is performed in such a situation and AF evaluation values in respective lens positions are acquired, an evaluation value of an image as a whole is as indicated by an AF evaluation value curve 3 indicated by a bold line in FIG. 3. If such a change in an evaluation value curve occurs during the focus operation, an evaluation value acquired by a camera changes from a value on a thin line to a value on a bold line in FIG. 3 or vice versa. Therefore, a peak position of an evaluation value recognized by the camera is different from a correct focus point position for the target subject. As a result, a defocused picture is obtained.

In particular, in self-timer photographing, a person himself/herself as a main subject solely depresses a release button as a shutter. Thus, except photographing of a picture of plural people such as a group picture, the person as the main subject is not present in an angle of view at timing when the release button is half-pressed and the camera performs the focus operation.

Therefore, when a sequence of the focus operation and photographing processing in the self-timer photographing is set as a sequence of the focus operation at a point when the release button is half-pressed and photographing at a point when a fixed time has elapsed after deep-press operation as in the normal photographing, it is difficult to photograph a picture focused on the main subject.

Therefore, in the self-timer photographing, it is desirable to perform the focus operation immediately before photographing when it is expected that the person as the main subject is in the angle of view. As a technique in the past that discloses control of such execution timing of the focus operation, there is JP-A-10-293342. JP-A-10-293342 discloses a technique that allows a user to change timing for performing the focus operation in the self-timer photographing according to the number of people as subjects.

In the self-timer photographing, there is a temporal difference between time when operation of an imaging apparatus is executed and time when photographing is actually performed. Thus, an unexpected person often cuts into a photographing angle of view immediately before the photographing. In this case, a person as an original subject is photographed while being hidden behind another person, resulting in a failed picture.

Even when, regardless of the fact that another person crosses in front of the camera immediately before photographing, the person disappears at an instance of the photographing and the original subject is successfully photographed, since the person crosses in front of the camera during the focus operation, eventually, a defocused picture is obtained.

As a technique for solving such a problem in that another person cuts in an angle of view immediately before photographing, for example, JP-A-6-202222 discloses a method of prohibiting photographing or delaying photographing timing when a photometric value during waiting time of the self-timer photographing changes. JP-A-5-203862 discloses a method of prohibiting photographing when there is a difference between a range finding value at the time of release operation of a shutter button and a range finding value immediately before photographing.

However, in these methods, when a detection error of a change in a photometric value or a misjudgment of measurement of a range finding value occurs, it is likely that photographing is stopped regardless of the fact that the photographing is performed correctly. For example, when a photometric value is used as a guideline, if it is attempted to photograph a person as a main subject with a motion scene of a moving car, a Ferris wheel, or the like in the background, it is likely that photographing is stopped because a change in the photometric value is detected regardless of the fact that the photographing can be performed normally. When a range finding value is used as a guideline, for example, since the range finding value changes at a stage when a photographer who performs release operation enters a photographing angle of view, photographing is stopped against the photographer's will.

SUMMARY OF THE INVENTION

Therefore, it is desirable to provide an imaging apparatus, an imaging apparatus control method, and a computer program that make it possible to perform quick and accurate auto-focus processing for a target subject. It is desirable to provide an imaging apparatus, an imaging apparatus control method, and a computer program that perform correct focus control corresponding to a target subject, for example, even when another person cuts in front of the target subject during a focus operation.

According to an embodiment of the invention, there is provided an imaging apparatus including a face detecting unit that detects a face area from an input image inputted in the imaging apparatus and a control unit that executes a focus operation according to adjustment of a focus lens. The control unit judges, on the basis of the number and sizes of the faces detected, whether, during the focus operation, a new face has appeared in a position closer to the imaging apparatus than a position of a face closest to the imaging apparatus among faces detected before the start of the focus operation and performs processing for re-executing or stopping the focus operation on the basis of a judgment result indicating that a new face has appeared in a position closer to the imaging apparatus.

According to the embodiment of the invention, the control unit executes processing for comparing the number of detected faces before the start of the focus operation (N1) and the number of detected faces during the focus operation (N2), when N2 is larger than N1, executes processing for comparing a distance to the face closest to the imaging apparatus before the start of the focus operation (S1) and a distance to a face closest to the imaging apparatus during the focus operation (S2), and, when S2 is smaller than S1, stops the focus operation and performs processing for re-executing or stopping the focus operation.

According to the embodiment of the invention, the control unit performs control for stopping the focus operation during the focus operation on the basis of the judgment result indicating that a new face has appeared in a position closer to the imaging apparatus and, after confirming disappearance of the new face the has appeared in the position close to the photographing apparatus, re-executing the focus operation.

According to the embodiment of the invention, the control unit performs control for stopping the focus operation during the focus operation on the basis of the judgment result indicating that a new face has appeared in a position closer to the imaging apparatus, executing re-execution of the focus operation, and, when the number of times of the focus operation has reached a maximum number of times of retry, stopping the focus operation.

According to the embodiment of the invention, the control unit performs control for stopping the focus operation during the focus operation on the basis of the judgment result indicating that a new face has appeared in a position closer to the imaging apparatus, standing by for disappearance of the new face that has appeared in the position close to the imaging apparatus, and, when disappearance of the new face is not confirmed even when a retry waiting time set in advance has elapsed, stopping the focus operation.

According to the embodiment of the invention, the control unit performs processing for judging re-execution or stop of the focus operation based on the number and sizes of detected faces during the focus operation on condition that self-timer photographing or remote control photographing is set.

According to the embodiment of the invention, the control unit controls a focus operation for acquiring an evaluation value corresponding to movement of the focus lens and calculating a peak of the evaluation value.

According to another embodiment of the invention, there is provided an imaging apparatus control method of executing auto-focus control in an imaging apparatus, the imaging apparatus control method including a face detecting step of detecting, in a face detecting unit, a face area from an input image, a focus-operation executing step of executing, in a control unit, a focus operation according to adjustment of a focus lens, and a processing determining step of judging, in the control unit, on the basis of the number and sizes of the faces detected, whether, during the focus operation, a new face has appeared in a position closer to the imaging apparatus than a position of a face closest to the imaging apparatus among faces detected before the start of the focus operation and performing processing for re-executing or stopping the focus operation on the basis of a judgment result indicating that a new face has appeared in a position closer to the imaging apparatus.

According to the embodiment of the invention, the processing determining step is a step of executing processing for comparing the number of detected faces before the start of the focus operation (N1) and the number of detected faces during the focus operation (N2), when N2 is larger than N1, executing processing for comparing a distance to the face closest to the imaging apparatus before the start of the focus operation (S1) and a distance to a face closest to the imaging apparatus during the focus operation (S2), and, when S2 is smaller than S1, stopping the focus operation and performing processing for re-executing or stopping the focus operation.

According to the embodiment of the invention, the processing determining step includes a step of performing control for stopping the focus operation during the focus operation on the basis of the judgment result indicating that a new face has appeared in a position closer to the imaging apparatus and, after confirming disappearance of the new face the has appeared in the position close to the photographing apparatus, re-executing the focus operation.

According to the embodiment of the invention, the processing determining step includes a step of performing control for stopping the focus operation during the focus operation on the basis of the judgment result indicating that a new face has appeared in a position closer to the imaging apparatus, executing re-execution of the focus operation, and, when the number of times of the focus operation has reached a maximum number of times of retry, stopping the focus operation.

According to the embodiment of the invention, the processing determining step includes a step of performing control for stopping the focus operation during the focus operation on the basis of the judgment result indicating that a new face has appeared in a position closer to the imaging apparatus, standing by for disappearance of the new face that has appeared in the position close to the imaging apparatus, and, when disappearance of the new face is not confirmed even when a retry waiting time set in advance has elapsed, stopping the focus operation.

According to the embodiment of the invention, the imaging apparatus control method further includes a step of performing, in the control unit, processing for judging re-execution or stop of the focus operation based on the number and sizes of detected faces during the focus operation on condition that self-timer photographing or remote control photographing is set.

According to the embodiment of the invention, the focus-operation executing step is a step of executing a focus operation for acquiring an evaluation value corresponding to movement of the focus lens and calculating a peak of the evaluation value.

According to still another embodiment of the invention, there is provided a computer program for causing an imaging apparatus to execute auto-focus control, the computer program causing the imaging apparatus to execute a face detecting step of detecting, in a face detecting unit, a face area from an input image, a focus-operation executing step of executing, in a control unit, a focus operation according to adjustment of a focus lens, and a processing determining step of judging, in the control unit, on the basis of the number and sizes of the faces detected, whether, during the focus operation, a new face has appeared in a position closer to the imaging apparatus than a position of a face closest to the imaging apparatus among faces detected before the start of the focus operation and performing processing for re-executing or stopping the focus operation on the basis of a judgment result indicating that a new face has appeared in a position closer to the imaging apparatus.

The computer program according to the embodiment of the invention is a computer program that can be provided to, for example, a computer system capable of executing various program codes through a storage medium provided in a computer readable format, a communication medium, recording media such as a CD, an FD, and an MO, or a communication medium such as a network. By providing such a program in a computer readable format, processing corresponding to the program is realized on the computer system.

Other objects, characteristics, and advantages of the invention will be apparent through more detailed explanations based on embodiments of the invention described later and attached drawings. In this specification, a system is a logical set of plural apparatuses and is not limited to apparatuses of various structures housed in an identical housing.

According to an embodiment of the invention, in the auto-focus processing in the imaging apparatus, a face area is detected from an input image, a subject distance is calculated on the basis of the size of a detected face, it is judged, on the basis of the number and sizes of the faces detected, whether, during a focus operation, a new face has appeared in a position closer to the imaging apparatus than a position of a face closest to the imaging apparatus among faces detected before the start of the focus operation, and processing for re-executing or stopping the focus operation is performed on the basis of a judgment result indicating that a new face has appeared in a position closer to the imaging apparatus. When it is judged that another person has appeared in a position in front of a target subject, the focus operation is stopped and, after it is confirmed that the another person has gone, the focus operation is executed again. According to the embodiment, it is possible to surely execute focus adjustment for the target subject and satisfactory photographing of an image without a focus error is realized.

BRIEF DESCRIPTION OF THE DRAWINGS

FIGS. 4A to 4C are diagrams for explaining an example of an external structure of an imaging apparatus according to an embodiment of the invention;

FIG. 10 is a diagram for explaining an example of focus display.

DESCRIPTION OF THE PREFERRED EMBODIMENTS

Figure 1:
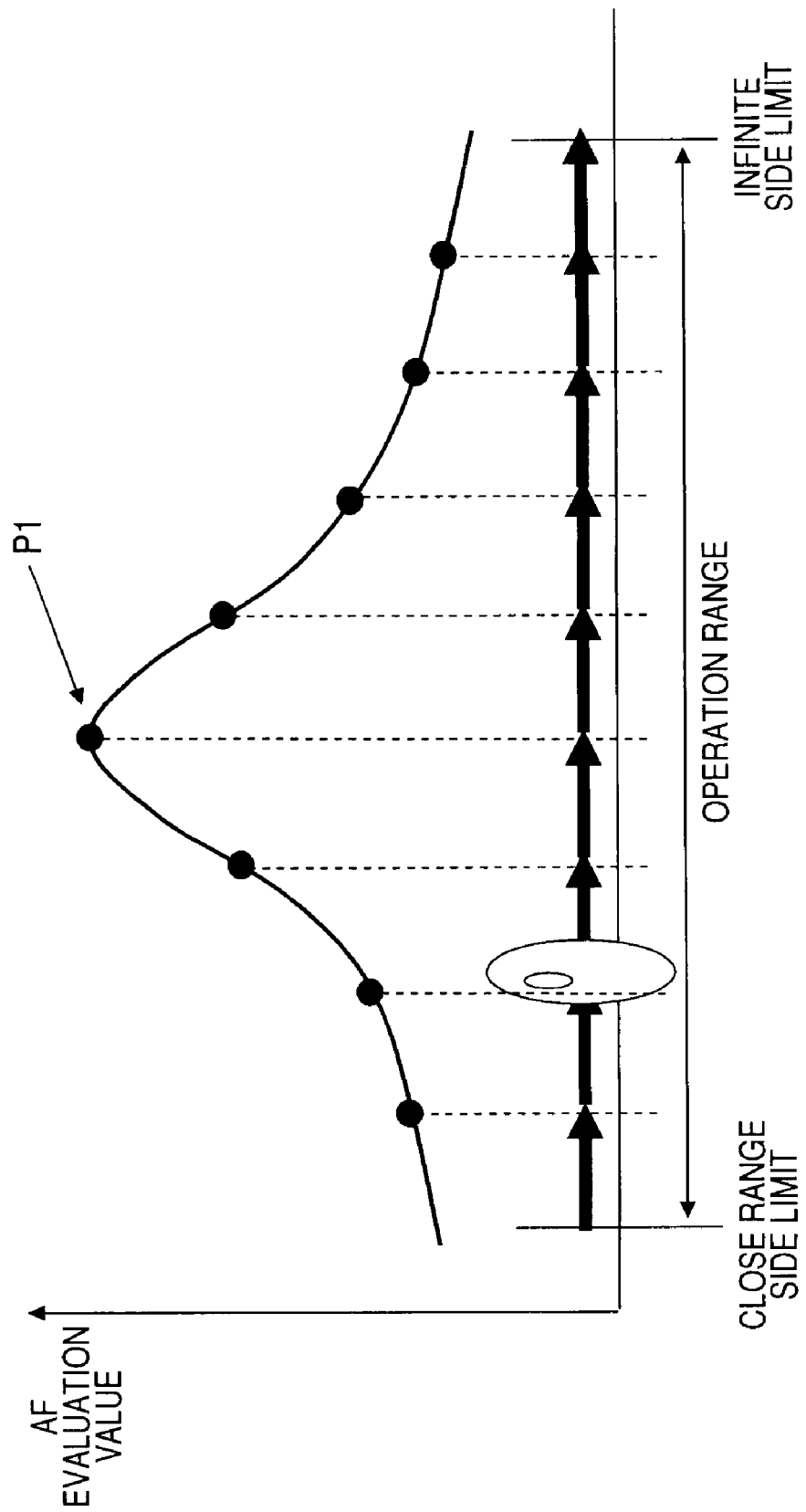
FIG. 1 is a diagram for explaining an example of lens driving and AF evaluation value acquisition processing executed as a focus operation in focus control.
Figure 2:
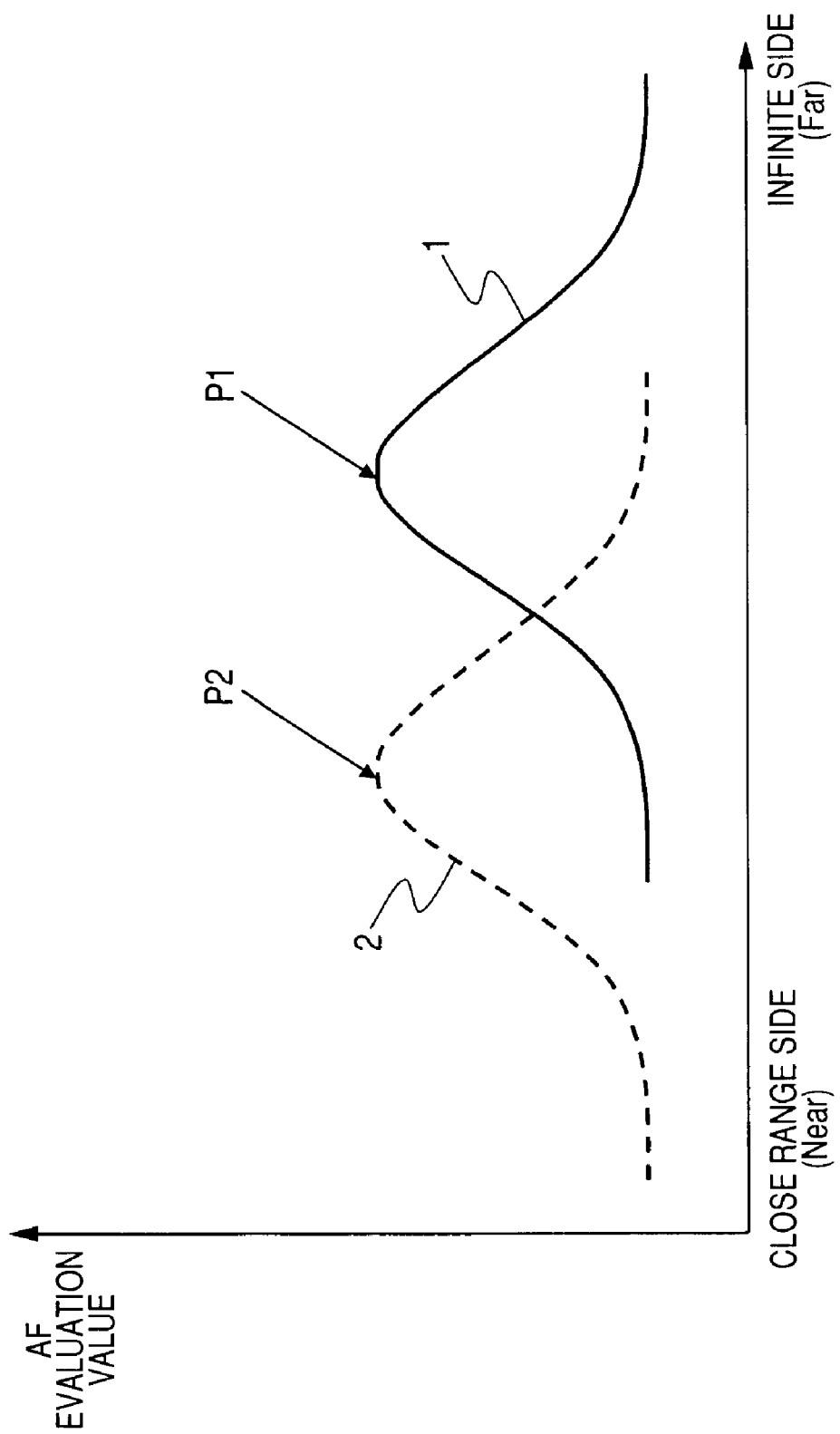
FIG. 2 is a diagram for explaining an influence due to plural people in the AF evaluation value acquisition processing as the focus operation.
Figure 3:
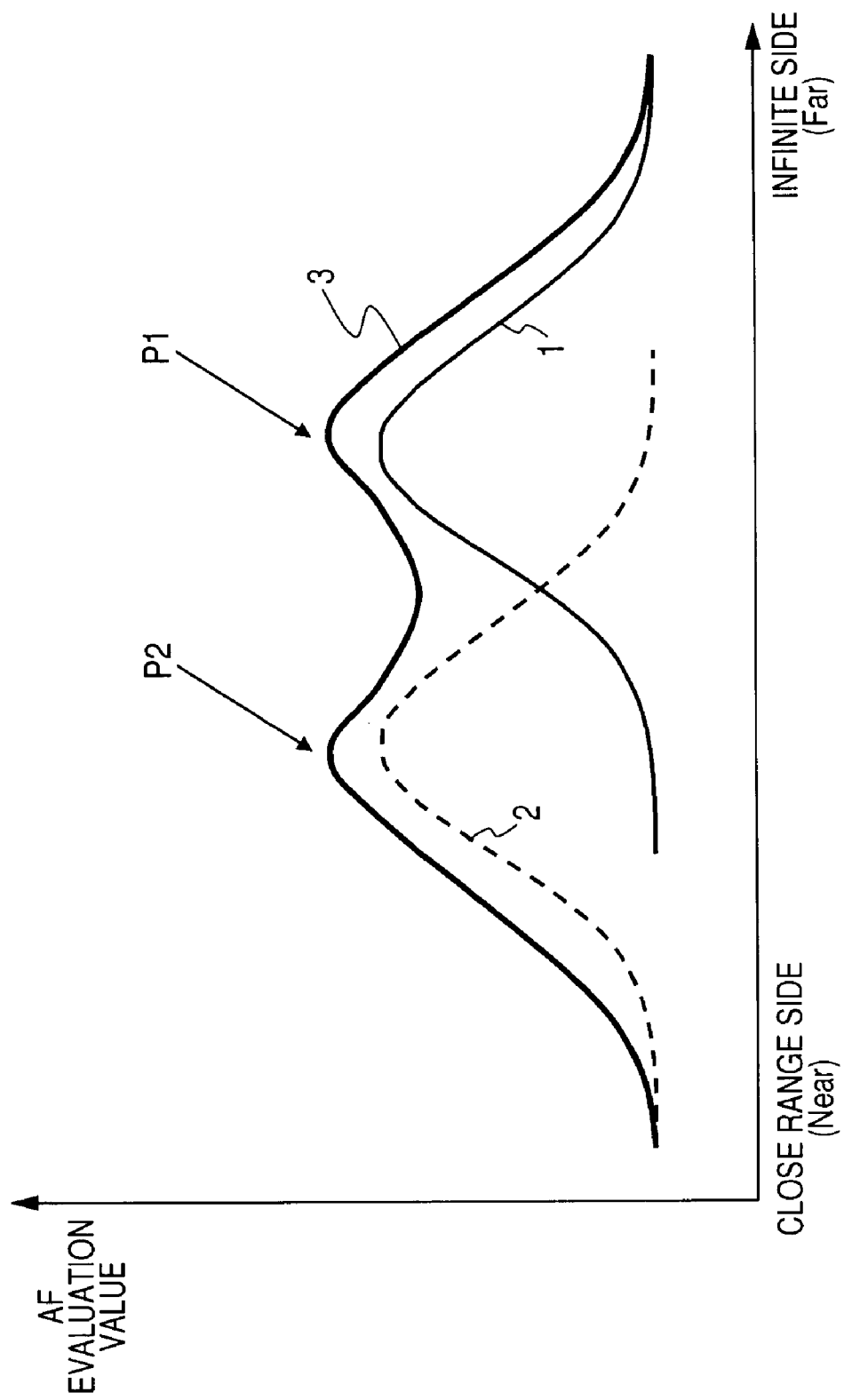
FIG. 3 is a diagram for explaining an influence due to plural people in the AF evaluation value acquisition processing as the focus operation.

Details of an imaging apparatus, an imaging apparatus control method, and a computer program according to an embodiment of the invention will be hereinafter explained with reference to the accompanying drawings.

In the embodiment of the invention, a technique for making it possible to perform quick and accurate auto-focus for a target subject is disclosed. In the imaging apparatus according to the embodiment, as a method of focus control, a method of judging a level of contrast of imaging data acquired via a lens is used as a basis. The imaging apparatus sets a specific area of a photographed image as a signal acquisition area (a spatial frequency extraction area) for focus control, judges that the lens is more in focus as contrast of this specific area is higher and that the lens is out of focus when the contrast is low, and drives the lens to a position for increasing the contrast to adjust the focus.

Specifically, a method of extracting a high-frequency component of the specific area, generating integrated data of the high-frequency component extracted, and judging a level of contrast on the basis of the high-frequency component integrated data generated is applied to the imaging apparatus. In other words, the imaging apparatus calculates a high-frequency component integrated value of the specific area to judge the level of the contrast and uses this high-frequency component integrated value as an evaluation value (an AF evaluation value). Auto-focus is realized by driving a focus lens to maximize the evaluation value. To perform the auto-focus, it is necessary to drive the lens with the evaluation value as a guideline. As a lens driving mechanism, for example, a voice coil motor is used.

In this embodiment, in the focus control using such contrast identification processing, during a focus operation for judging a size of a face of a person as a target subject, calculating a distance to the subject on the basis of the size, and moving a focus lens to acquire an AF evaluation value, when a face having a distance shorter than the subject distance calculated is detected, the focus operation is stopped and re-executed. This further makes it possible to perform correct focus control corresponding to the target subject even when another person cuts in front of the target subject during the focus operation.

First, a structure of the imaging apparatus according to this embodiment will be explained with reference to the drawings. FIGS. 4A to 4C are diagrams showing an external appearance of an imaging apparatus 10. FIG. 4A is a plan view of the imaging apparatus 10, FIG. 4B is a front view of the imaging apparatus 10, and FIG. 4C is a rear view of the imaging apparatus 10. A lens portion of the plan view in FIG. 4A is shown as a sectional view. The imaging apparatus 10 has a power supply switch 11, trigger means for setting image capturing timing, i.e., a release switch 12 functioning as a shutter, a monitor 13 that displays an image (a through image) photographed by the imaging apparatus, operation information, and the like, an imager 14 as an imaging device (a CCD), zoom buttons 15 for performing zoom control, operation buttons 16 for inputting various kinds of operation information, a viewfinder 17 for checking the image (the through image) photographed by the imaging apparatus, a focus lens 18 driven in focus adjustment, a zoom lens 19 driven in zoom adjustment, a mode dial 20 for setting a photographing mode, a focus lens motor (M1) 21 for driving the focus lens 18, and a zoom lens motor (M2) 22 for driving the zoom lens 19.

A subject image is displayed on the viewfinder 17 and the monitor 13. The viewfinder 17 and the monitor 13 are constituted by, for example, LCDs. The subject image obtained through the lenses is displayed on the viewfinder 17 and the monitor 13 as a moving image. This moving image is called a through image. A user checks the viewfinder 17 or the monitor 13, checks a target subject to be photographed, and presses the release switch 12 as the shutter to execute recording processing for the image.

Figure 5:
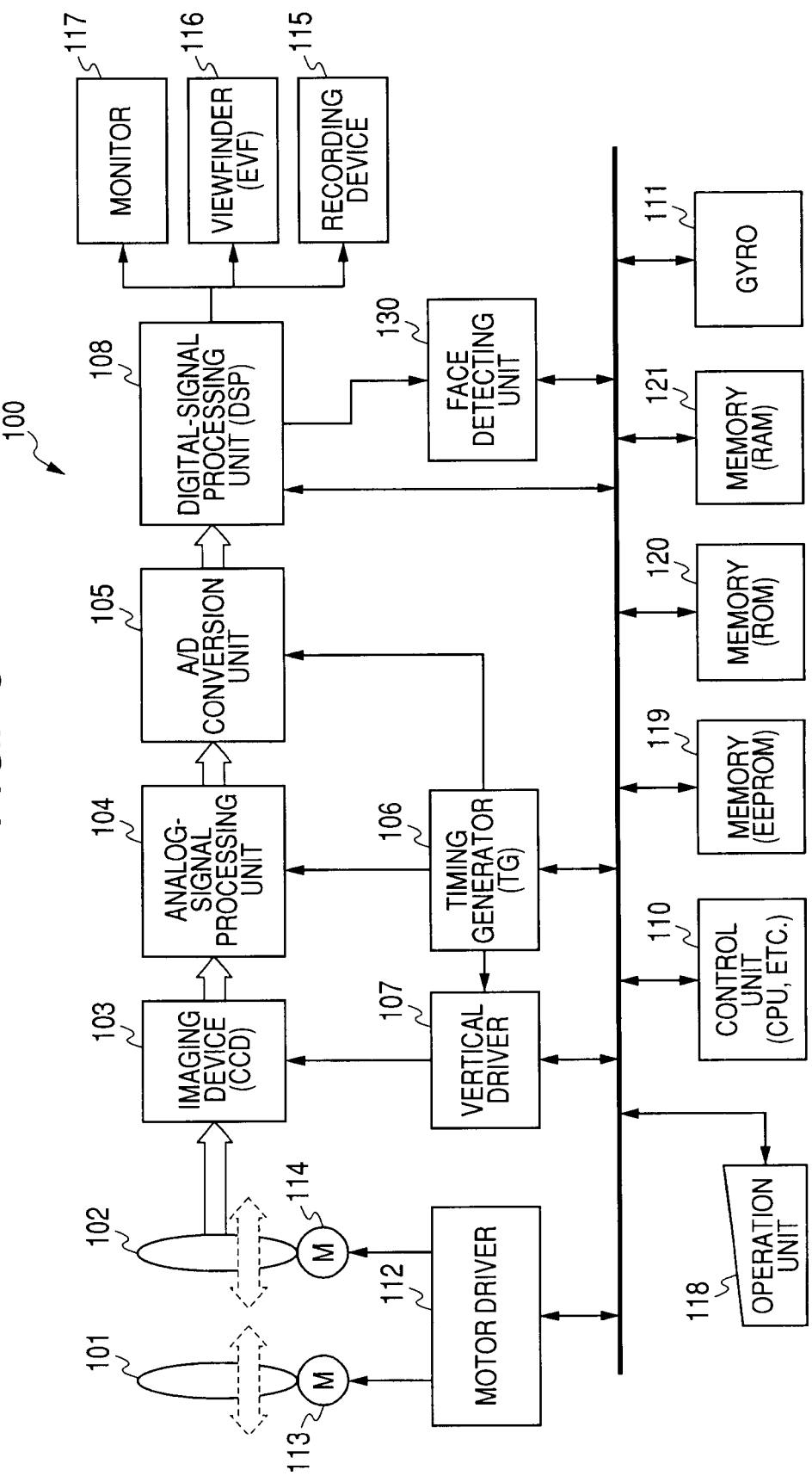
FIG. 5 is a diagram for explaining an example of a hardware configuration of the imaging apparatus according to the embodiment of the invention.

An internal structure of an imaging apparatus 100 according to this embodiment will be explained with reference to FIG. 5. The imaging apparatus according to this embodiment is an imaging apparatus having an auto-focus function. Incident light through a focus lens 101 and a zoom lens 102 is inputted to an imaging device 103 such as a CCD (Charge Coupled Device) and photoelectrically converted in the imaging device 103. Photoelectrically converted data is inputted to an analog-signal processing unit 104, subjected to processing such as noise removal in the analog-signal processing unit 104, and converted into a digital signal in an A/D conversion unit 105. The data converted into the digital signal in the A/D conversion unit 105 is recorded in a recording device 115 constituted by a flash memory or the like. The data is further displayed on a monitor 117 and a viewfinder (EVF) 116. An image obtained through the lenses is displayed as a through image on the monitor 117 and the viewfinder (EVF) 116 regardless of whether photographing is performed.

An operation unit 118 is an operation unit including the release switch 12, the zoom buttons 15, the operation buttons 16 for inputting various kinds of operation information, and the mode dial 20 for setting a photographing mode provided in a camera main body explained with referenced to FIGS. 4A to 4C. A control unit 110 has a CPU and executes control of various kinds of processing executed by the imaging apparatus in accordance with programs stored in a memory (ROM) 120 and the like in advance. A memory (EEPROM) 119 is a nonvolatile memory. Image data, various kinds of supplementary information, programs, and the like are stored in the memory 119. The memory (ROM) 120 stores programs, arithmetic operation parameters, and the like used by the control unit (the CPU) 110. A memory (RAM) 121 stores programs used in the control unit (the CPU) 110, parameters that change in execution of the programs as appropriate, and the like. A gyro 111 detects an inclination, a shake, and the like of the imaging apparatus. Detection information is inputted to the control unit (the CPU) 110 and processing such as hand shake prevention is executed.

A motor driver 112 drives a focus-lens driving motor 113 set in association with the focus lens 101 and a zoom-lens driving motor 114 set in association with the zoom lens 102. A vertical driver 107 drives the imaging device (the CCD) 103. A timing generator 106 generates a control signal for processing timing of the imaging device 103 and the analog-signal processing unit 104 and controls the processing timing of these processing units.

A face detecting unit 130 analyzes image data inputted through the lenses and detects a face of a person in the image data. Face detection information is sent to the control unit 110. The control unit 110 judges a size of the face of the person as a target subject on the basis of the face information detected and estimates a distance to the subject on the basis of the size. The control unit 110 further performs quick focus control with a focus control range narrowed by applying information on this estimation to the focus control. Moreover, in estimation processing of a subject distance based on the size of the face, the control unit 110 performs processing taking into account an individual difference, a difference of race, a difference of age, a difference of sex, and the like to realize accurate distance estimation.

In the imaging apparatus according to this embodiment, as described above, in focus control, the method of judging a level of contrast in imaging data acquired through the lenses is used as a basis. During a focus operation for judging a size of a face of a person as a target subject, calculating a distance to the subject on the basis of the size, and moving a focus lens to acquire an AF evaluation value, when a face having a distance shorter than the subject distance calculated is detected, the imaging apparatus stops the focus operation and executes the focus operation again. This processing further makes it possible to perform correct focus control corresponding to the target subject even when another person cuts in front of the target subject during the focus operation.

It is highly likely that photographing processing for a focus error due to interruption of another person is performed in, in particular, a self-timer photographing mode in which it is difficult for a user to stop photographing immediately before the photographing is performed. In the following description, a processing example in the self-timer photographing mode will be mainly explained. First, an outline of overall processing executed in the imaging apparatus according to this embodiment will be explained and, then, details of respective kinds of processing such as face detection and distance calculation processing will be explained.

(1) Outline of Overall Processing

Figure 6:
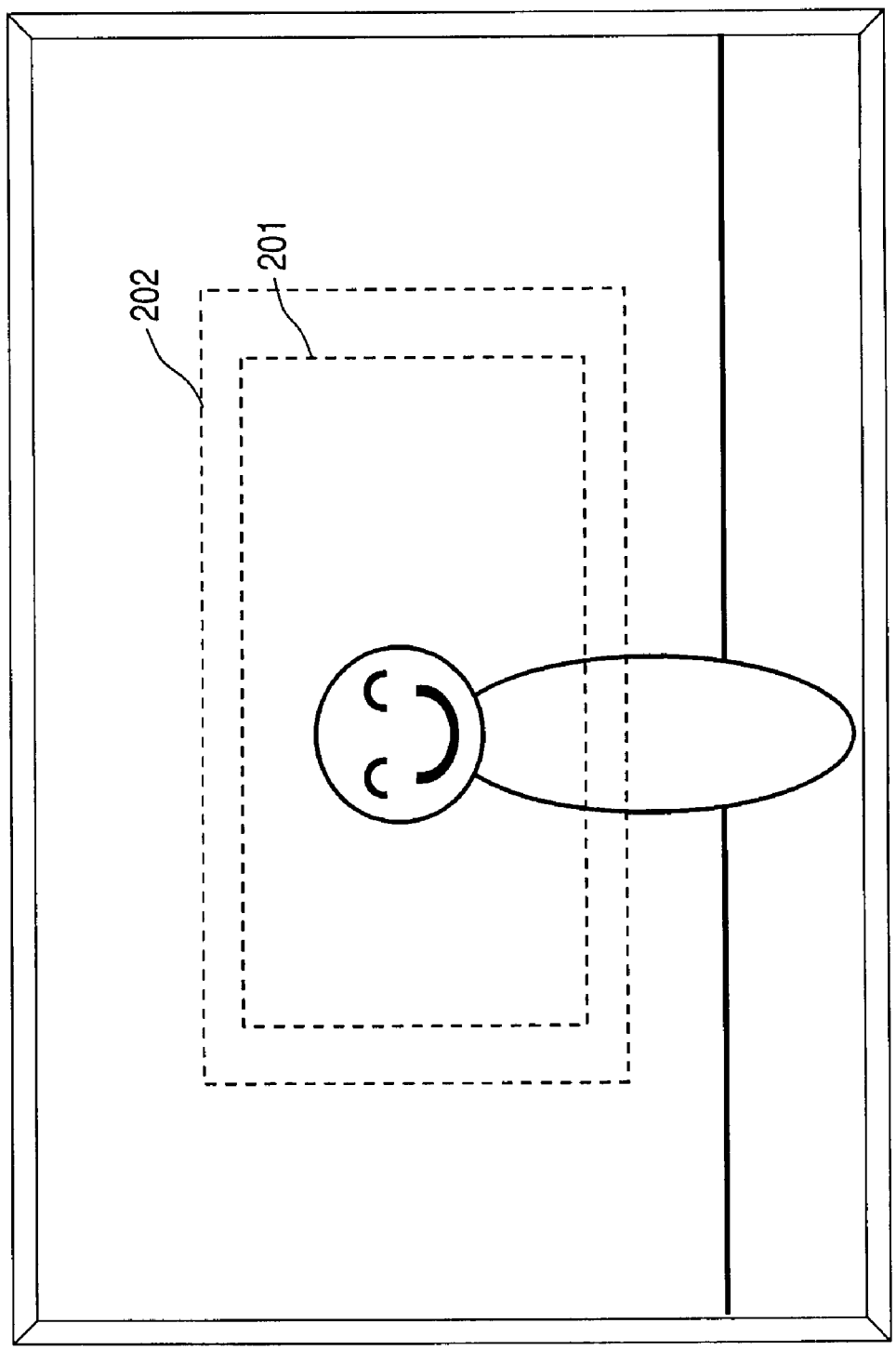
FIG. 6 is a diagram for explaining an example of setting of an detection area for AF, which is an image area for acquisition of an AF evaluation value, and a face detection area, which is an image area for face detection processing.

When an imaging apparatus (a camera) is set in the self-timer photographing mode, as shown in FIG. 6, a detection area for AF 201, which is an image area for acquisition of an AF evaluation value in auto-focus processing, and a face detection area 202, which is an image area for face detection processing, are set in an angle of view of an image (a through image) acquired in the imaging apparatus. According to the setting of these two image areas, processing for detecting that a person cuts in during a focus operation is started.

The detection area for AF 201 and the face detection area 202 may be set in separate areas according to uses of the areas. Usually, the face detection area 202 is arranged to cover a range same as the detection area for AF 201 or a range including the detection area for AF 201 and wider than the detection area for AF 201. This makes it possible to accurately detect that a person cuts in during the focus operation.

After the imaging apparatus is set in the self-timer photographing mode, when a release button equivalent to a shutter button is depressed, a timer counter starts to operate and counts time until photographing. During this period, for example, the imaging apparatus detects faces in the face detection area 202 shown in FIG. 6, calculates the number of faces detected [N1] and a distance to a face closest to the imaging apparatus among the detected faces [S1], and holds the number of faces [N1] and the distance [S1]. Details of the face detection and the distance calculation will be described in detail later.

The distance to the face closest to the imaging apparatus [S1] and the number of faces detected [N1] are continued to be updated at a fixed time interval until a timer count set in advance is counted. In other words, this is processing for moving a focus lens, acquiring an AF evaluation value, and calculating a peak as explained with reference to FIG. 1 above.

Figure 7:
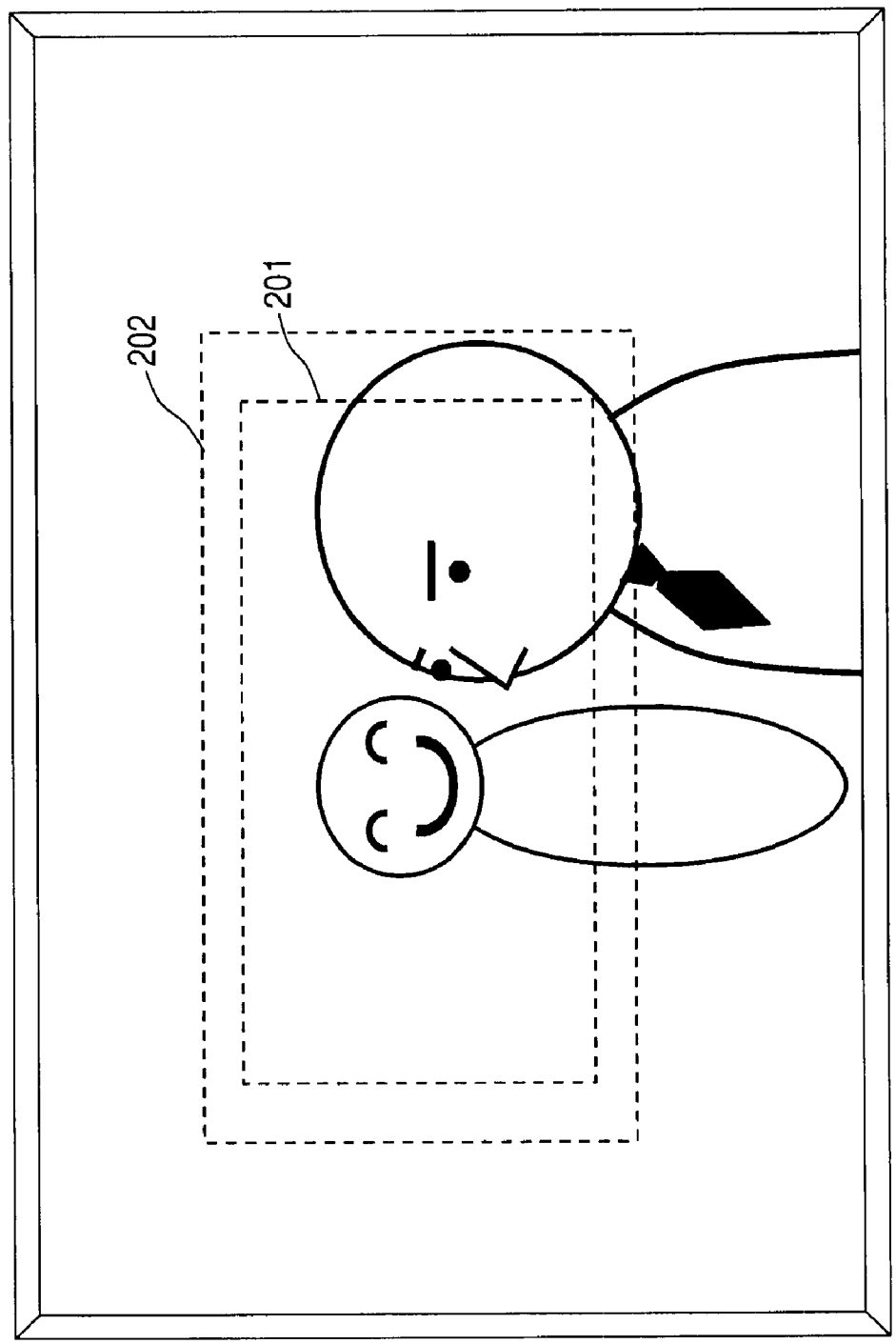
FIG. 7 is a diagram for explaining an example of correspondence between the detection area for AF and the face detection area at the time when another person crosses in front of the imaging apparatus during execution of the focus operation.

For example, it is assumed that another person crosses in front of the imaging apparatus from outside the angle of view after the start of the focus operation. Specifically, it is assumed that a state shown in FIG. 7 has occurred. During the focus operation, the imaging apparatus according to this embodiment performs the face detection processing at a fixed time interval and compares the number of faces detected [N2] and the number of faces detected until immediately before the start of the focus operation [N1] whenever necessary. In examples in FIGS. 6 and 7, when it is assumed that FIG. 6 shows a state immediately before the start of the focus operation and FIG. 7 shows a state during the focus operation, the number of faces detected until immediately before the start of the focus operation [N1] is 1 and the number of faces detected during the focus operation [N2] is 2.

When the number of faces detected during the focus operation increases compared with that before the start of the focus operation, the imaging apparatus compares distances to faces closest to the imaging apparatus among the faces detected before the focus operation and during the focus operation [S1] and [S2], respectively. When the distance to the face closest to the imaging apparatus detected during the focus operation [S2] is smaller than the distance to the face closest to the imaging apparatus detected before the focus operation [S1], the imaging apparatus judges that another person crosses a position in front of a target subject, immediately stops the focus operation, discards all evaluation values acquired to that point, and shifts to retry waiting processing.

The retry waiting processing is performed for the purpose of detecting that the person who cut in front of the imaging apparatus has moved out of the angle of view, i.e., the person is not included in an image photographed by the imaging apparatus, judging that it is possible to start the focus operation based on an image of only the target subject, and issuing a permission for resuming the focus operation. Specifically, the following processing is performed.

When retry processing is started, the imaging apparatus according to this embodiment updates the number of faces present in a detection area [Nnow] and a distance to a face closest to the imaging apparatus among the faces detected [Snow] at a fixed time interval. Compared with those at the time when retry is started, when the number of faces has decreased and the distance to the face closest to the imaging apparatus has increased by a threshold [Thr] set in advance or more, the imaging apparatus judges that the person who cut in front of the imaging apparatus has gone and permits the retry. In preparation for a case in which the person who cut in front of the imaging apparatus does not leave easily, a counter for measuring a retry waiting time is prepared. When this counter reaches a fixed or larger value, the imaging apparatus cancels the retry and judges that it may be impossible to perform focusing.

To prevent a situation in which, even if the retry of the focus operation is repeatedly executed, new people cut in front of the imaging apparatus and the target subject is not photographed for a long time, a limit is set on the number of times of continuous retry waiting processing. The imaging apparatus judges that it may be impossible to perform focusing when a retry waiting time is out or when the number of times of the retry has reached the limit. When it is judged that it may be impossible to perform focusing, the imaging apparatus moves the focus lens to, for example, a position designated by a fixed value and performs photographing.

According to this processing, it is possible to improve the likelihood that processing with the target subject set as a focus control object is executed and photograph a focused picture without a focus error. In photographing other than self-timer photographing, for example, remote control photographing, it is possible to photograph a focused image without a focus error at a high probability.

Details of respective kinds of processing executed in the imaging apparatus according to this embodiment will be explained. The imaging apparatus specifies a face area of a person as a target subject from image data photographed by the imaging apparatus and executes distance calculation based on the face image. In other words, the imaging apparatus executes face area detection by the face detecting unit 130 and calculation of a distance to the face by the control unit 110. A specific processing constitution for this processing will be hereinafter explained. Explanations will be made in the following order of items.

(1) Face identification processing
(2) Subject distance calculation processing based on a size of a face (1) Face Identification Processing First, processing executed by the face detecting unit 130, i.e., a method of specifying a face area of a person from image data acquired by the imaging apparatus will be explained. As a technique for recognizing and tracking a face, various techniques have already been disclosed. It is possible to apply these existing techniques to the technique for recognizing and tracking a face. The technique can be realized by matching of a template having luminance distribution information of a face recorded therein to an actual image described in, for example, JP-A-2004-133637. First, plural kinds of images obtained by applying reduction processing to the actual image are prepared. A group of luminance distribution information templates of a face obtained when a person leans the face is prepared in advance. Matching of the images and the templates is subsequently performed. The templates are templates inclined with respect to each of X, Y, and Z axes of a face three-dimensional orthogonal coordinate system. An actual inclination of the face is judged according to matching with the templates.

When the matching of the reduced images with the templates is sequentially performed while shifting the images on a two-dimensional plane, if a certain area matches the templates, the area is a position where the face is present. It is possible to calculate a size of the face from a reduction ratio of the actual image. It is possible to calculate a rotation angle, a yaw, a pitch, and a roll angle around the orthogonal three axes from the templates used in the matching. A distance to the face is calculated using the size, the position, and the rotation angle of the face obtained in this way.

(2) Subject Distance Calculation Processing Based on a Size of a Face

Figure 8:
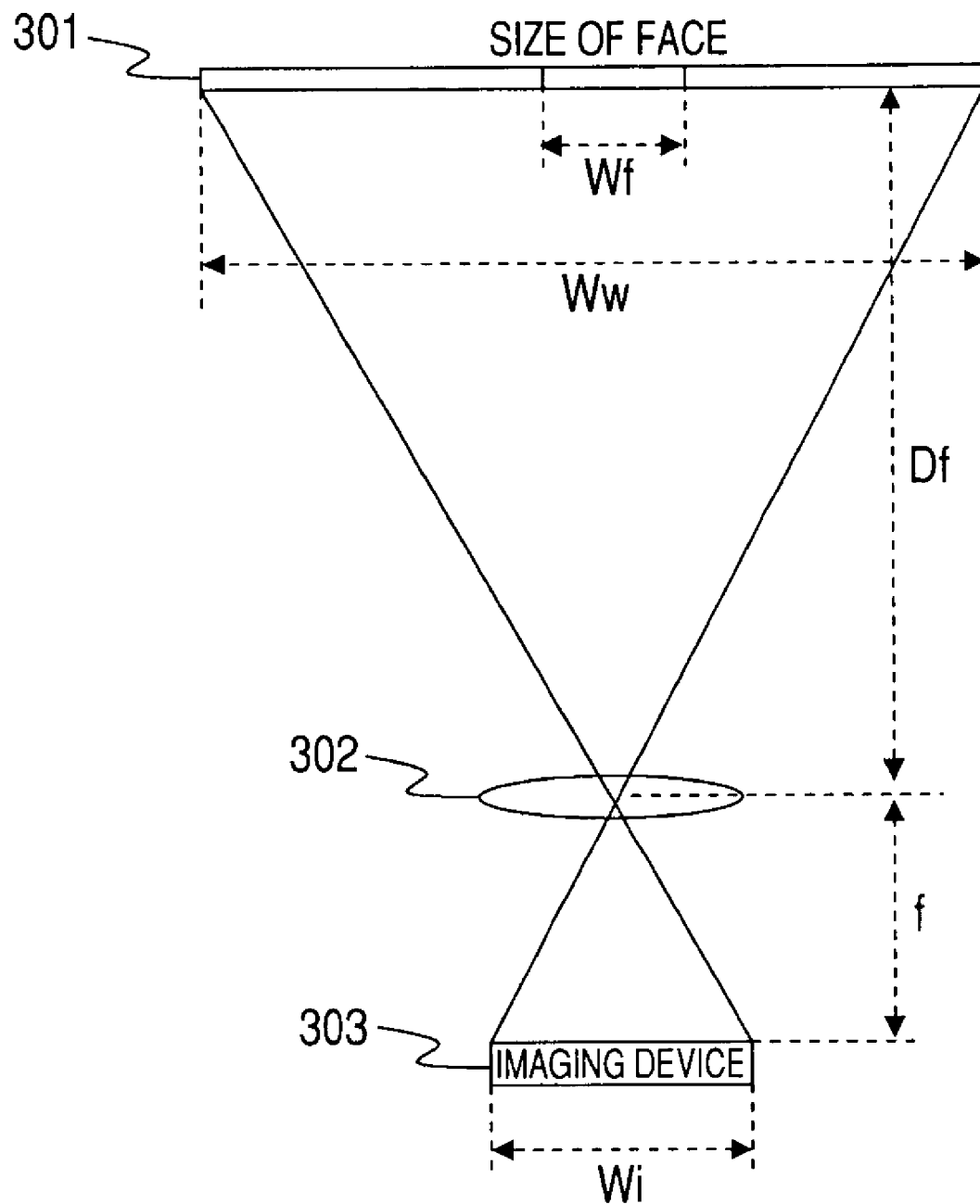
FIG. 8 is a diagram for explaining subject distance calculation processing based on a size of a face.

A specific method of calculating a distance to a face will be hereinafter explained. The imaging apparatus according to this embodiment calculates a distance to a face according to a size of the face included in an image photographed by the imaging apparatus. This processing will be explained with reference to FIG. 8. A subject position 301, a focus lens 302, and an imaging device 303 are shown in FIG. 8. A face of a person is present in the subject position 301. A size of the face (the width of the face) is Wf.

If the actual size (Wf) of the face is known, from a basic physical law of lenses, it is possible to calculate a distance to the face, i.e., a subject distance (Df), which is a distance from the focus lens 302 to the subject position 301, according to the following equation.

$$Df = Wref \times (f/Wi) \times (Ww/Wf) \quad \text{(Equation 1.1)}$$

where Wref is a reference value of a size of a face of a person, Wi is the width of an imaging device, f is a focal length, Wf is the number of pixels (an imaging device detection value) of a size of the face of the person in a photographed image, and Ww is the number of pixels (an imaging device detection value) of a size of an image used for detection of the face of the person.

It is possible to use a fixed value set in advance as the reference value of a size of a face of a person (Wref). It is possible to perform processing with this face size reference value (Wref) set to a value obtained by taking into account an individual difference, a difference of race, a difference of age, a difference of sex, and the like. According to this processing, it is possible to realize more accurate distance estimation.

The imaging apparatus calculates the subject distance (Df) on the basis of an image (a through image) photographed by applying Equation 1.1 to the calculation.

Specifically, when the number of faces detected during a focus operation increases from that before the start of the focus operation, the imaging apparatus compares distances to faces closest to the imaging apparatus among the faces detected before the focus operation and during the focus operation [S1] and [S2]. When the distance to the face closest to the imaging apparatus detected during the focus operation [S2] is smaller than the distance to the face closest to the imaging apparatus detected before the focus operation [S1], the imaging apparatus judges that another person crosses a position in front of a target subject, immediately stops the focus operation, discards all evaluation values acquired to that point, and shifts to retry waiting processing.

Figure 9:
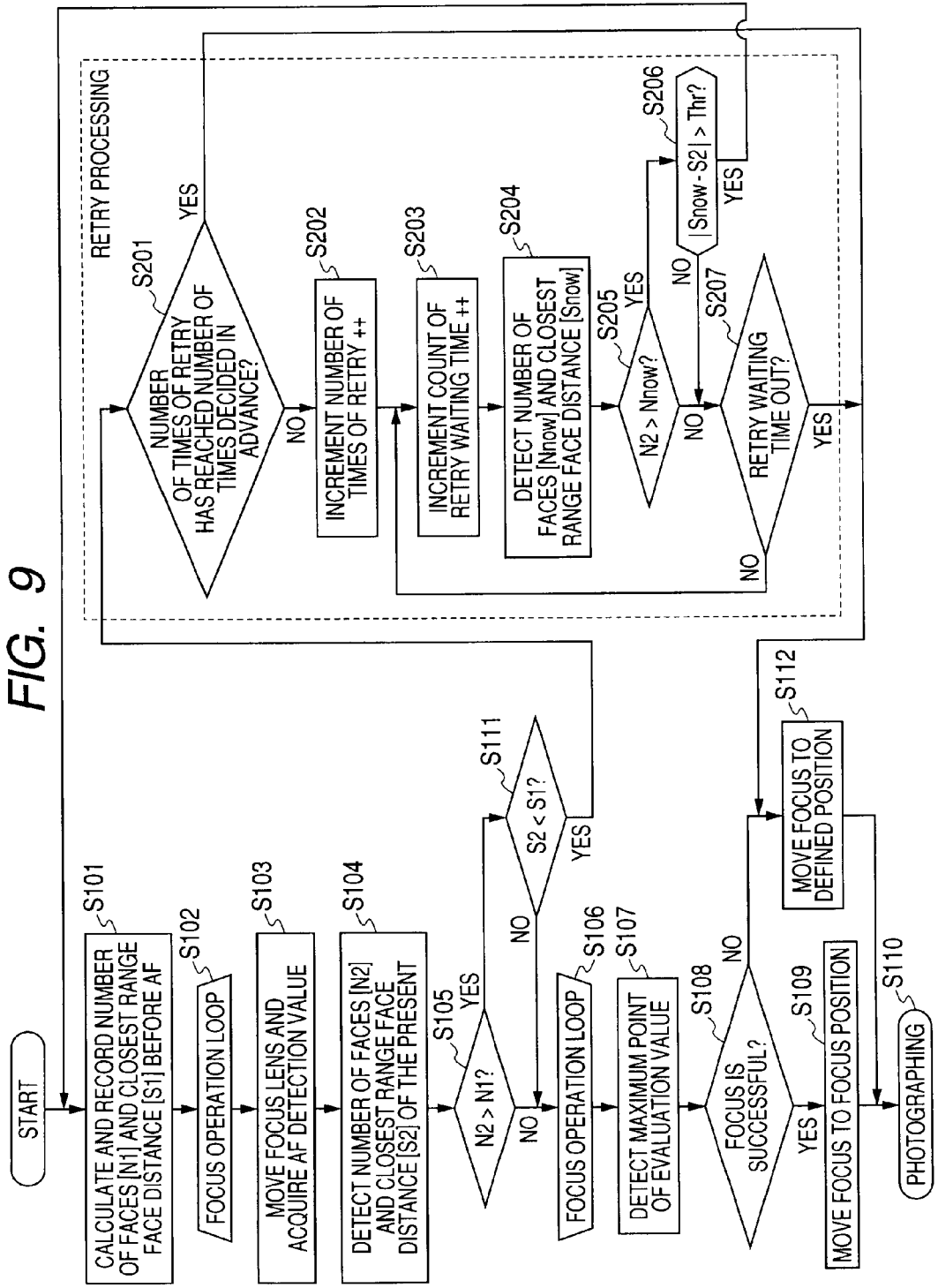
FIG. 9 is a flowchart for explaining an example of a sequence of processing executed in the imaging apparatus according to the embodiment of the invention.

A sequence of processing executed in the imaging apparatus according to this embodiment will be explained with reference to a flowchart shown in FIG. 9. The processing indicated by the flowchart shown in FIG. 9 is executed by controlling the respective components such as the face detecting unit 130 under the control by the control unit 110 of the imaging apparatus shown in FIG. 5. For example, the processing is executed as processing performed after self-timer photographing or remote control photographing is set, the user operates the release button, and the timer starts.

For example, after a self-timer photographing mode and a remote control photographing mode are set, when the release button equivalent to the shutter button or the remote controller is performed, the timer counter starts to operate and counts time until photographing. Thereafter, in step S101, the control unit 110 detects, for example, faces in the face detection area 202 shown in FIG. 6, calculates the number of faces detected [N1] and a distance to a face closest to the imaging apparatus among the faces detected [S1], and records and holds the number [N1] and the distance [S1] in the storing unit.

As explained above, the face detection processing is performed according to, for example, matching of a template having luminance distribution information of a face recorded therein to an actual image. A subject distance (Df) is calculated according to the following equation as explained with reference to FIG. 8.

$$Df = Wref \times (f/Wi) \times (Ww/Wf) \quad \text{(Equation 1.1)}$$

It is possible to perform processing with this face size reference value (Wref) set to a value obtained by taking into account an individual difference, a difference of race, a difference of age, a difference of sex, and the like. According to this processing, it is possible to realize more accurate distance estimation.

In step S101, the control unit 110 executes such face detection and distance calculation and records and holds the number of faces detected [N1] and the distance to the face closest to the imaging apparatus among the faces detected [S1] in the storing unit.

Steps S102 to S106 is a focus operation loop. As explained with reference to FIG. 1, processing for moving the focus lens, acquiring an AF evaluation value at each moving point, and calculating a peak is executed. Step S103 is a processing for acquiring an AF evaluation value (i.e., an AF detection value) at one moving point of the focus lens. In the next step S104, the control unit 110 executes face detection from images acquired at present in the imaging apparatus and calculates the number of faces detected during the focus operation [N2] and a distance to a face closest to the imaging apparatus among the faces detected during the focus operation [S2].

In step S105, the control unit 110 executes comparison of the number of faces detected before the start of the focus operation [N1] and the number of faces detected during the focus operation [N2]. When a relational expression N2>N1 does not hold, the control unit 110 proceeds to step S106 and continues the focus operation. In other words, the control unit 110 proceeds to step S103, moves the focus lens to the next moving point, and acquires an AF evaluation value.

When the relational expression N2>N1 holds in step S105, this means that the number of faces has increased from that before the start of the focus operation. In this case, the control unit 110 proceeds to step S111 and compares distances to faces closest to the imaging apparatus among the faces detected before the focus operation and during the focus operation [S1] and [S2].

When a relational expression S2<S1 holds, the control unit 110 judges that a new person has appeared in front of the person closest to the imaging apparatus before the start of the focus operation and shifts to retry processing in steps S201 to S207.

When the relational expression S2<S1 does not hold in step S111, the control unit 110 judges that a new person has not appeared in front of the person closest to the imaging apparatus before the start of the focus operation, proceeds to step S106, and continues the focus operation. In other words, the control unit 110 proceeds to step S103, moves the focus lens to the next moving point, and acquires an AF evaluation value.

In a period of execution of the focus loop, when the relational expression N2>N1 holds (Yes in step S105) and the relational expression S2<S1 does not hold (No in step S111), the control unit 110 judges, during the focus operation, that a new person has not appeared in front of the person closest to the imaging apparatus before the start of the focus operation, proceeds to step S107, and detects a peak of an AF evaluation value curve obtained during the focus operation.

When a peak is detected, the control unit 110 judges in step S108 that the focusing is successful and proceeds to step S109. The control unit 110 sets the focus lens in a focus position and executes photographing processing in step S110. When a peak is not detected, the control unit 110 judges in step S108 that the focusing has failed and proceeds to step S112. After moving the focus lens to a focus lens setting position set in advance, the control unit 110 executes the photographing processing in step S110.

On the other hand, in the period of execution of the focus loop, when the relational expression N2>N1 holds (Yes in step S105) and the relational expression S2<S1 holds (Yes in step S111), the control unit 110 judges, during the focus operation, that a new person has appeared in front of the person closest to the imaging apparatus before the start of the focus operation, proceeds to step S201, and shifts to retry processing.

In step S201, the control unit 110 judges whether the number of times of retry has reached the number of times of retry set in advance. When it is judged that the number of times of retry has reached the number of times of retry set in advance, the control unit 110 proceeds to step S112. After moving the focus lens to the focus lens setting position set in advance, the control unit 110 executes the photographing processing in step S110.

When it is judged in step S201 that the number of times of retry has not reached the number of times of retry set in advance, in step S202, the control unit 110 increments a count value of the number of times of retry by 1 and stores the count value in the storing unit. In step S203, the control unit 110 starts count of a retry waiting time. In step S204, the control unit 110 calculates the number of faces detected from an image acquired at the present point [Nnow] and a distance to a face closest to the imaging apparatus among these detected faces [Snow].

Subsequently, in step S205, the control unit 110 executes comparison of the number of faces detected during the focus operation [N2] and the number of faces detected from the image acquired at the present point [Nnow].

When a relational expression N2>Nnow does not hold, this means that a face other than the faces detected before the start of the focus operation is present. The control unit 110 proceeds to step S206 and judges whether a difference absolute value [|Snow−S2|] between the distance to the face closest to the imaging apparatus among the faces detected from the images acquired at the present point [Snow] and the distance to the face closest to the imaging apparatus among the faces detected during the focus operation [S2] is larger than a threshold [Thr] set in advance.

When a relational expression |Snow−S2|>Thr does not hold and [|Snow-S2|] is not larger than the threshold [Thr] set in advance, the control unit 110 judges that the face detected anew during the focus operation is still present, proceeds to step S207, and judges whether time for retry waiting timeout set in advance has elapsed. When the time has not elapsed, the control unit 110 increments a retry waiting time count in step S203 and repeatedly executes processing step S204 and the subsequent steps.

When it is judged in step S207 that the time for the retry waiting timeout set in advance has elapsed, the control unit 110 judges that it may be impossible to perform focusing and proceeds to step S112. After moving the focus lens to the focus lens setting position set in advance, the control unit 110 executes the photographing processing in step S110.

On the other hand, when it is judged in step S206 that the relational expression |Snow−S2|>Thr holds and [|Snow-S2|] is larger than the threshold [Thr] set in advance, the control unit 110 judges that the face detected anew during the focus operation has gone, returns to step S101, and starts the count of the number of faces, the distance calculation, and the focus operation again. In starting this processing, after all the evaluation values acquired to that point are discarded, the processing is executed as new processing.

When it is judged in step S108 that the focusing is successful, the control unit 110 presents a focus frame indicating that the focusing is successful in a display image on the monitor of the imaging apparatus and notifies the user that the focusing is successful. For example, the control unit 110 performs focus display on, for example, a specific face. The focus display is identification information indicating completion of the focusing presented in an image displayed on the monitor or the viewfinder. The user is capable of surely photographing a subject by checking this focus display and pressing a shutter to photograph the subject.

An example of the focus display is shown in FIG. 10. The example shown in FIG. 10 is an example in which the focus display is performed in an image displayed on a monitor of a camera as the imaging apparatus. For example, when the imaging apparatus succeeds in peak detection according to the AF evaluation value calculation and focusing on a face of a certain person, the imaging apparatus sets a focus frame 331 on a face 321 successfully focused. Moreover, when it is judged that a face 322 and a face 323 are also in an allowable focus depth set in advance at this focus point, the imaging apparatus displays focus frames 332 and 333 on the faces. The user is capable of surely photographing a subject by checking this focus display, pressing a shutter, and photographing the subject.

As explained above, according to the processing explained with reference to the flowchart shown in FIG. 9, when the distance to the face closest to the imaging apparatus detected during the focus operation [S2] is smaller than the distance to the face closest to the imaging apparatus detected before the focus operation [S1], the imaging apparatus according to this embodiment judges that another person crosses a position in front of the target subject, immediately stops the focus operation, and, after it is confirmed that the another person has gone, executes the focus processing again. Thus, it is possible to surely execute focus adjustment for the target subject and photographing of a satisfactory image without a focus error is realized.

The invention has been explained in detail with reference to the specific embodiment. However, it is obvious that those skilled in the art can perform correction and substitution of the embodiment without departing from the spirit of the invention. The invention has been disclosed in a form of illustration and should not be interpreted limitedly. To judge the gist of the invention, the appended claims should be taken into account.

It is possible to execute the series of processing explained in this specification with hardware, software, or a combination of the hardware and the software. When the processing by the software is executed, it is possible to install a program having a processing sequence recorded therein in a memory in a computer built in dedicated hardware and execute the program. Alternatively, it is possible to install the program in a general-purpose computer capable of executing various kinds of processing and execute the program.

For example, it is possible to record the program in a hard disk or a ROM (Read Only Memory) as a recording medium in advance. Alternatively, it is possible to temporarily or permanently store (record) the program in a removable recording medium such as a flexible disk, a CD-ROM (Compact Disc Read Only Memory), an MO (Magneto Optical) disk, a DVD (Digital Versatile Disk), a magnetic disk, or a semiconductor memory. It is possible to provide such a removable recording medium as so-called package software.

Other than installing the program in a computer from the removable recording medium, it is possible to transfer the program to the computer by radio or transfer the program to the computer via a network such as a LAN (Local Area Network) or the Internet by wire from a download site. The computer can receive the program transferred in that way and install the program in a recording medium such as a hard disk built therein.

The various kinds of processing described in this specification are not only executed in time series in accordance with the above description but may be executed in parallel or individually according to a processing ability of an apparatus that executes the processing or when necessary. In this specification, the system is a logical set of plural apparatuses and is not limited to apparatuses of various structures housed in an identical housing.

As explained above, according to the embodiment of the invention, in the auto-focus processing in the imaging apparatus, a face area is detected from an input image, a subject distance is calculated on the basis of the size of a detected face, it is judged, on the basis of the number and sizes of the faces detected, whether, during a focus operation, a new face has appeared in a position closer to the imaging apparatus than a position of a face closest to the imaging apparatus among faces detected before the start of the focus operation, and processing for re-executing or stopping the focus operation is performed on the basis of a judgment result indicating that a new face has appeared in a position closer to the imaging apparatus. When it is judged that another person has appeared in a position in front of a target subject, the focus operation is stopped and, after it is confirmed that the another person has gone, the focus operation is executed again. According to the embodiment, it is possible to surely execute focus adjustment for the target subject and satisfactory photographing of an image without a focus error is realized.

It should be understood by those skilled in the art that various modifications, combinations, sub-combinations, and alterations may occur depending on design requirements and other factors insofar as they are within the scope of the appended claims or the equivalents thereof.

What is claimed is:

1. An imaging apparatus, comprising:
   a face detecting unit that detects a face area from an input image inputted in the imaging apparatus; and
   a control unit that executes a focus operation according to adjustment of a focus lens, wherein
   the control unit judges, on the basis of a number and sizes of the faces detected, whether, during the focus operation, a new face has appeared in a position closer to the imaging apparatus than a position of a face closest to the imaging apparatus among faces detected before the start of the focus operation and performs processing for re-executing or stopping the focus operation on the basis of a judgment result indicating that a new face has appeared in a position closer to the imaging apparatus, wherein
   the control unit executes processing for comparing a number of detected faces before the start of the focus operation (N1) and a number of detected faces during the focus operation (N2), when N2 is larger than N1, executes processing for comparing a distance to the face closest to the imaging apparatus before the start of the focus operation (S1) and a distance to a face closest to the imaging apparatus during the focus operation (S2), and, when S2 is smaller than S1, stops the focus operation and performs processing for re-executing or stopping the focus operation.

2. An imaging apparatus according to claim 1, wherein the control unit performs control for stopping the focus operation during the focus operation on the basis of the judgment result indicating that a new face has appeared in a position closer to the imaging apparatus, executing re-execution of the focus operation, and, when a number of times of the focus operation has reached a maximum number of times of retry, stopping the focus operation.

3. An imaging apparatus according to claim 1, wherein the control unit performs processing for judging re-execution or stop of the focus operation based on the number and sizes of detected faces during the focus operation on condition that self-timer photographing or remote control photographing is set.

4. An imaging apparatus according to claim 1, wherein the control unit controls a focus operation for acquiring an evaluation value corresponding to movement of the focus lens and calculating a peak of the evaluation value.

5. An imaging apparatus, comprising:
   a face detecting unit that detects a face area from an input image inputted in the imaging apparatus; and
   a control unit that executes a focus operation according to adjustment of a focus lens, wherein
   the control unit judges, on the basis of a number and sizes of the faces detected, whether, during the focus operation, a new face has appeared in a position closer to the imaging apparatus than a position of a face closest to the imaging apparatus among faces detected before the start of the focus operation and performs processing for re-executing or stopping the focus operation on the basis of a judgment result indicating that a new face has appeared in a position closer to the imaging apparatus, wherein
   the control unit performs control for stopping the focus operation during the focus operation on the basis of the judgment result indicating that a new face has appeared in a position closer to the imaging apparatus and, after confirming disappearance of the new face that has appeared in the position close to the imaging apparatus, re-executing the focus operation.

6. An imaging apparatus, comprising:
a face detecting unit that detects a face area from an input image inputted in the imaging apparatus; and
a control unit that executes a focus operation according to adjustment of a focus lens, wherein
the control unit judges, on the basis of a number and sizes of the faces detected, whether, during the focus operation, a new face has appeared in a position closer to the imaging apparatus than a position of a face closest to the imaging apparatus among faces detected before the start of the focus operation and performs processing for re-executing or stopping the focus operation on the basis of a judgment result indicating that a new face has appeared in a position closer to the imaging apparatus, wherein
the control unit performs control for stopping the focus operation during the focus operation on the basis of the judgment result indicating that a new face has appeared in a position closer to the imaging apparatus, standing by for disappearance of the new face that has appeared in the position close to the imaging apparatus, and, when disappearance of the new face is not confirmed even when a retry waiting time set in advance has elapsed, stopping the focus operation.

7. An imaging apparatus control method, comprising:
detecting, in a face detecting unit, a face area from an input image;
executing, in a control unit, a focus operation according to adjustment of a focus lens; and
judging, in the control unit, on the basis of a number and sizes of the faces detected, whether, during the focus operation, a new face has appeared in a position closer to the imaging apparatus than a position of a face closest to the imaging apparatus among faces detected before the start of the focus operation and performing processing for re-executing or stopping the focus operation on the basis of a judgment result indicating that a new face has appeared in a position closer to the imaging apparatus, wherein
the performing processing for re-executing or stopping the focus operation includes comparing a number of detected faces before the start of the focus operation (N1) and a number of detected faces during the focus operation (N2), when N2 is larger than N1, executing processing for comparing a distance to the face closest to the imaging apparatus before the start of the focus operation (S1) and a distance to a face closest to the imaging apparatus during the focus operation (S2), and, when S2 is smaller than S1, stopping the focus operation and performing processing for re-executing or stopping the focus operation.

8. An imaging apparatus control method according to claim 7, wherein performing processing for re-executing or stopping the focus operation includes performing control for stopping the focus operation during the focus operation on the basis of the judgment result indicating that a new face has appeared in a position closer to the imaging apparatus, executing re-execution of the focus operation, and, when the number of times of the focus operation has reached a maximum number of times of retry, stopping the focus operation.

9. An imaging apparatus control method according to claim 7, further comprising:
performing, in the control unit, processing for judging re-execution or stop of the focus operation based on the number and sizes of detected faces during the focus operation on condition that self-timer photographing or remote control photographing is set.

10. An imaging apparatus control method according to claim 7, wherein the executing the focus operation includes executing a focus operation for acquiring an evaluation value corresponding to movement of the focus lens and calculating a peak of the evaluation value.

11. An imaging apparatus control method, comprising:
detecting, in a face detecting unit, a face area from an input image;
executing, in a control unit, a focus operation according to adjustment of a focus lens; and
judging, in the control unit, on the basis of a number and sizes of the faces detected, whether, during the focus operation, a new face has appeared in a position closer to the imaging apparatus than a position of a face closest to the imaging apparatus among faces detected before the start of the focus operation and performing processing for re-executing or stopping the focus operation on the basis of a judgment result indicating that a new face has appeared in a position closer to the imaging apparatus, wherein
the performing processing for re-executing or stopping the focus operation includes performing control for stopping the focus operation during the focus operation on the basis of the judgment result indicating that a new face has appeared in a position closer to the imaging apparatus and, after confirming disappearance of the new face that has appeared in the position close to the imaging apparatus, re-executing the focus operation.

12. An imaging apparatus control method, comprising:
detecting, in a face detecting unit, a face area from an input image;
executing, in a control unit, a focus operation according to adjustment of a focus lens; and
judging, in the control unit, on the basis of a number and sizes of the faces detected, whether, during the focus operation, a new face has appeared in a position closer to the imaging apparatus than a position of a face closest to the imaging apparatus among faces detected before the start of the focus operation and performing processing for re-executing or stopping the focus operation on the basis of a judgment result indicating that a new face has appeared in a position closer to the imaging apparatus, wherein
the performing processing for re-executing or stopping the focus operation includes performing control for stopping the focus operation during the focus operation on the basis of the judgment result indicating that a new face has appeared in a position closer to the imaging apparatus, standing by for disappearance of the new face that has appeared in the position close to the imaging apparatus, and, when disappearance of the new face is not confirmed even when a retry waiting time set in advance has elapsed, stopping the focus operation.

13. A computer program for causing an imaging apparatus to execute auto-focus control, the computer program causing the imaging apparatus to execute a method comprising:
detecting, in a face detecting unit, a face area from an input image;
executing, in a control unit, a focus operation according to adjustment of a focus lens; and
judging, in the control unit, on the basis of a number and sizes of the faces detected, whether, during the focus operation, a new face has appeared in a position closer to the imaging apparatus than a position of a face closest to the imaging apparatus among faces detected before the start of the focus operation and performing processing for re-executing or stopping the focus operation on the basis of a judgment result indicating that a new face has appeared in a position closer to the imaging apparatus, wherein the performing processing for re-executing or stopping the focus operation includes is comparing a number of detected faces before the start of the focus operation (N1) and a number of detected faces during the focus operation (N2), when N2 is larger than N1, executing processing for comparing a distance to the face closest to the imaging apparatus before the start of the focus operation (S1) and a distance to a face closest to the imaging apparatus during the focus operation (S2), and, when S2 is smaller than S1, stopping the focus operation and performing processing for re-executing or stopping the focus operation.

14. A computer program for causing an imaging apparatus to execute auto-focus control, the computer program causing the imaging apparatus to execute a method comprising:

detecting, in a face detecting unit, a face area from an input image;

executing, in a control unit, a focus operation according to adjustment of a focus lens; and judging, in the control unit, on the basis of a number and sizes of the faces detected, whether, during the focus operation, a new face has appeared in a position closer to the imaging apparatus than a position of a face closest to the imaging apparatus among faces detected before the start of the focus operation and performing processing for re-executing or stopping the focus operation on the basis of a judgment result indicating that a new face has appeared in a position closer to the imaging apparatus, wherein the performing processing for re-executing or stopping the focus operation includes a performing control for stopping the focus operation during the focus operation on the basis of the judgment result indicating that a new face has appeared in a position closer to the imaging apparatus and, after confirming disappearance of the new face that has appeared in the position close to the imaging apparatus, re-executing the focus operation.

15. A computer program for causing an imaging apparatus to execute auto-focus control, the computer program causing the imaging apparatus to execute a method comprising:

detecting, in a face detecting unit, a face area from an input image;

executing, in a control unit, a focus operation according to adjustment of a focus lens; and judging, in the control unit, on the basis of a number and sizes of the faces detected, whether, during the focus operation, a new face has appeared in a position closer to the imaging apparatus than a position of a face closest to the imaging apparatus among faces detected before the start of the focus operation and performing processing for re-executing or stopping the focus operation on the basis of a judgment result indicating that a new face has appeared in a position closer to the imaging apparatus, wherein the performing processing for re-executing or stopping the focus operation includes performing control for stopping the focus operation during the focus operation on the basis of the judgment result indicating that a new face has appeared in a position closer to the imaging apparatus, standing by for disappearance of the new face that has appeared in the position close to the imaging apparatus, and, when disappearance of the new face is not confirmed even when a retry waiting time set in advance has elapsed, stopping the focus operation.

* * * * *